(12) United States Patent
Umbehocker (10) Patent No.: US 9,304,879 B2
(45) Date of Patent: Apr. 5, 2016

(54) HIGH AVAILABILITY FAILOVER UTILIZING DYNAMIC SWITCH CONFIGURATION

(71) Applicant: OS NEXUS, Inc., Mercer Island, WA (US)

(72) Inventor: Steven Michael Umbehocker, Mercer Island, WA (US)

(73) Assignee: OS NEXUS, INC., Mercer Island, WA (US)

( * ) Notice: Subject to any disclaimer, the term of this patent is extended or adjusted under 35 U.S.C. 154(b) by 250 days.

(21) Appl. No.: 13/793,934

(22) Filed: Mar. 11, 2013

(65) Prior Publication Data
US 2013/0238930 A1 Sep. 12, 2013

Related U.S. Application Data

(60) Provisional application No. 61/609,802, filed on Mar. 12, 2012.

(51) Int. Cl.
*G06F 11/00* (2006.01)
*G06F 11/20* (2006.01)

(52) U.S. Cl.
CPC .................................. *G06F 11/2092* (2013.01)

(58) Field of Classification Search
CPC .................................................. G06F 11/2092
See application file for complete search history.

(56) References Cited

U.S. PATENT DOCUMENTS

| | | | |
|---|---|---|---|
| 7,320,083 B2* | 1/2008 | Davies et al. | 714/3 |
| 7,843,906 B1* | 11/2010 | Chidambaram et al. | 370/386 |
| 2004/0088396 A1* | 5/2004 | Hammons et al. | 709/223 |
| 2010/0049919 A1* | 2/2010 | Winokur et al. | 711/114 |
| 2011/0173487 A1* | 7/2011 | Fujibayashi | 714/4.1 |
| 2012/0166724 A1* | 6/2012 | Smith | 711/114 |
| 2014/0281673 A1* | 9/2014 | Evans et al. | 714/4.11 |

* cited by examiner

*Primary Examiner* — Yolanda L Wilson
(74) *Attorney, Agent, or Firm* — Amin, Turocy & Watson, LLP (57) ABSTRACT

Movement of storage access is orchestrated between systems by dynamically reconfiguring zoning of a storage fabric. A failover system can detect a failure of a first initiator system that is assigned to a target storage system using a zone table of one or more network switches that are communicatively coupled to the target storage system. Further, the failover system can reassign the target storage system to a second initiator system using the zone table in response to a detection of the failure of the first initiator system, wherein the second initiator system is determined to be communicatively coupled to the one or more network switches. Furthermore, the failover system can initiate an access, via the one or more network switches based on the zone table, of the target storage system by the second initiator system.

22 Claims, 10 Drawing Sheets

HIGH AVAILABILITY FAILOVER UTILIZING DYNAMIC SWITCH CONFIGURATION

PRIORITY CLAIM

This application claims priority to U.S. Provisional Patent Application Ser. No. 61/609,802, filed on Mar. 12, 2012, entitled "METHOD FOR STORAGE HIGH-AVAILABILITY FAILOVER UTILIZING DYNAMIC SWITCH CONFIGURATION/ZONING", the entirety of which is incorporated by reference herein.

TECHNICAL FIELD

This disclosure relates generally to failover, but not limited to, high-availability failover utilizing dynamic switch configuration.

BACKGROUND

Storage system manufacturers have developed mechanisms to make their systems "highly available" (HA) in the event that any one or more hardware components within a given storage system fails. For example, when a hardware component fails, another component "steps in" to takes its place, and a server or consumer of the data is able to continuously access the data with little or no interruption to data access.

One conventional HA mechanism includes connecting at least two independent controllers to a Serial Attached Small Computer System Interface (SAS) or Fibre Channel (FC) disk drive at the same time. Such independent controllers are active or passive, in which only one controller has access to the SAS or FC disk drive at any given time. Another conventional HA mechanism includes mirroring data from a first storage system to a second storage system via a network link. In this scenario, each of the storage systems maintains a copy of the data. Such conventional failover technologies are inefficient and/or require specialized disk drives.

The above-described deficiencies of today's failover environments and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with orchestrating the assignment of storage access between servers by dynamically reconfiguring zoning of a storage fabric.

In one or more embodiments, a dynamic storage failover system (DSFS) including processor(s) can facilitate execution of computer-executable instructions to detect a failure of a first initiator system, e.g., a computing resource, a server, a virtual machine, a virtual storage appliance, etc. that is assigned, or mapped, to a target storage system, e.g., to storage space of the target storage system, etc. using a zone table, a zone data structure, etc. associated with one or more network switches that are communicatively coupled to the target storage system.

In one aspect, the failure can be associated with the first initiator system being determined, e.g., by the DSFS, to be "off-line", e.g., unresponsive to a query, a communication, etc. that is directed to the first initiator system, e.g., by the DSFS. For example, the failure can include a failure of a component, e.g., a processor, a computing device, a memory device, a host bus adapter (HBA), etc. of the first initiator system. In another example, the failure can include a communication failure between the first initiator system and the target storage system, e.g., caused by a missing and/or damaged cable, communication link, etc. between the first initiator system and the one or more network switches.

In another aspect, the target storage system can include a block storage device, a "just a bunch of disks" (JBOD) storage device, a redundant array of inexpensive disks (RAID) "bunch of disks" (RBOD) storage device, a virtual storage appliance, etc. Further, the target storage device can include: Small Computer System Interface (SCSI) storage devices, which are based on a peripheral, peer-to-peer interface that can be used, e.g., in personal computer (PC) server systems; Serial Advanced Technology Attachment (SATA) storage devices; SCSI-over-Fiber Channel storage devices; SAS devices; Internet SCSI (iSCSI) devices, which are associated with an Internet Protocol (IP) based storage networking standard for linking data storage facilities and/or entities; Advanced Technology (AT) Attachment (ATA) storage devices; ATA over Ethernet (AoE) storage devices; other Storage Area Network (SAN) devices, etc.

In yet another aspect, the zone table can include identification (ID) information representing the first initiator system, the target storage system, and a second initiator system—the first initiator system and the second initiator system determined to be communicatively coupled to the one or more network switches. Further, in response to a detection, e.g., by the DSFS, of the failure of the first initiator system, the DSFS can reassign, remap, etc. the target storage system to the second initiator system, e.g., a computing resource, a server, a virtual machine, a virtual storage appliance, etc. using the zone table, e.g., by mapping a block device ID, e.g., or logical unit number (LUN), of the target storage system to a port ID of the second initiator system, e.g., by replacing a first port ID of the first initiator system in the zone table with a second port ID of the second initiator system. Additionally, the DSFS can initiate an access of the target storage system by the second initiator system—the second initiator system accessing the target storage system via the one or more network switches according to the zone table. As such, the DSFS can perform HA failover by dynamically reconfiguring switch zoning of a storage fabric in response to identification of a system failure.

In one non-limiting implementation, a method can include identifying, by a failover system comprising a processor, a failure of a first system, e.g., a computing resource, a server, a virtual machine, a virtual storage appliance, etc. that is assigned to a storage system via a zone table, data structure, etc. associated with one or more network switches that are communicatively coupled to the storage system. Further, the method can include remapping, by the failover system using the zone table in response to the identifying the failure, the storage system to a second system determined to be communicatively coupled to the one or more network switches. Furthermore, the method can include configuring, by the failover system, an access, via the one or more network switches, of the storage system by the second system using the zone table.

In one aspect, the first system and/or the second system can include a computing resource, a server, a virtual machine, a virtual storage appliance, etc. In another aspect, the storage system can include a block storage device, JBOD, an RBOD, a virtual storage appliance, etc. Further, the target storage device can include: SCSI storage devices, SATA storage devices, SCSI-over-Fiber Channel storage devices, SAS devices, iSCSI devices, ATA storage devices; AoE storage devices; other SAN devices, etc.

In one embodiment, the identifying includes determining whether the first system is off-line and/or unresponsive to a query directed to the first system. In another embodiment, the remapping includes assigning the second system to the storage system using identification information of the zone table representing the second system and the storage system.

Another non-limiting limitation can include a computer-readable storage medium comprising instructions that, in response to execution, cause a computing system comprising a processor to perform operations. Further, the operations can include detecting a failure associated with a first initiator system that is assigned to a target storage system using a zone table, a zone data structure, etc. associated with one or more network switches communicatively coupled to the target storage system; reassigning, using the zone table in response to detecting the failure, the target storage system to a second initiator system determined to be communicatively coupled to the one or more network switches; and initiating an access, via the one or more network switches using the zone table, of storage of the target storage system by the second initiator system.

In one embodiment, the detecting the failure can include determining whether the first initiator system is at least one of off-line or unresponsive to a query directed to the first initiator system. In another embodiment, the reassigning can include mapping the second initiator system to the storage of the storage system using identification information of the zone table representing the second initiator system and the storage system.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Various non-limiting embodiments of systems, methods, and apparatus presented herein provide for high availability (HA) failover by dynamically reconfiguring switch zoning of a storage fabric in response to identification of a system failure. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to detect a failure of a first initiator system that is assigned to a target storage system using a zone table associated with one or more network switches that are communicatively coupled to the target storage system. Further, the artificial intelligence system can reassign, using the zone table, the target storage system to a second initiator system that is determined to be communicatively coupled to the one or more network switches in response to a detection of the failure of the first initiator system.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Figure 1:
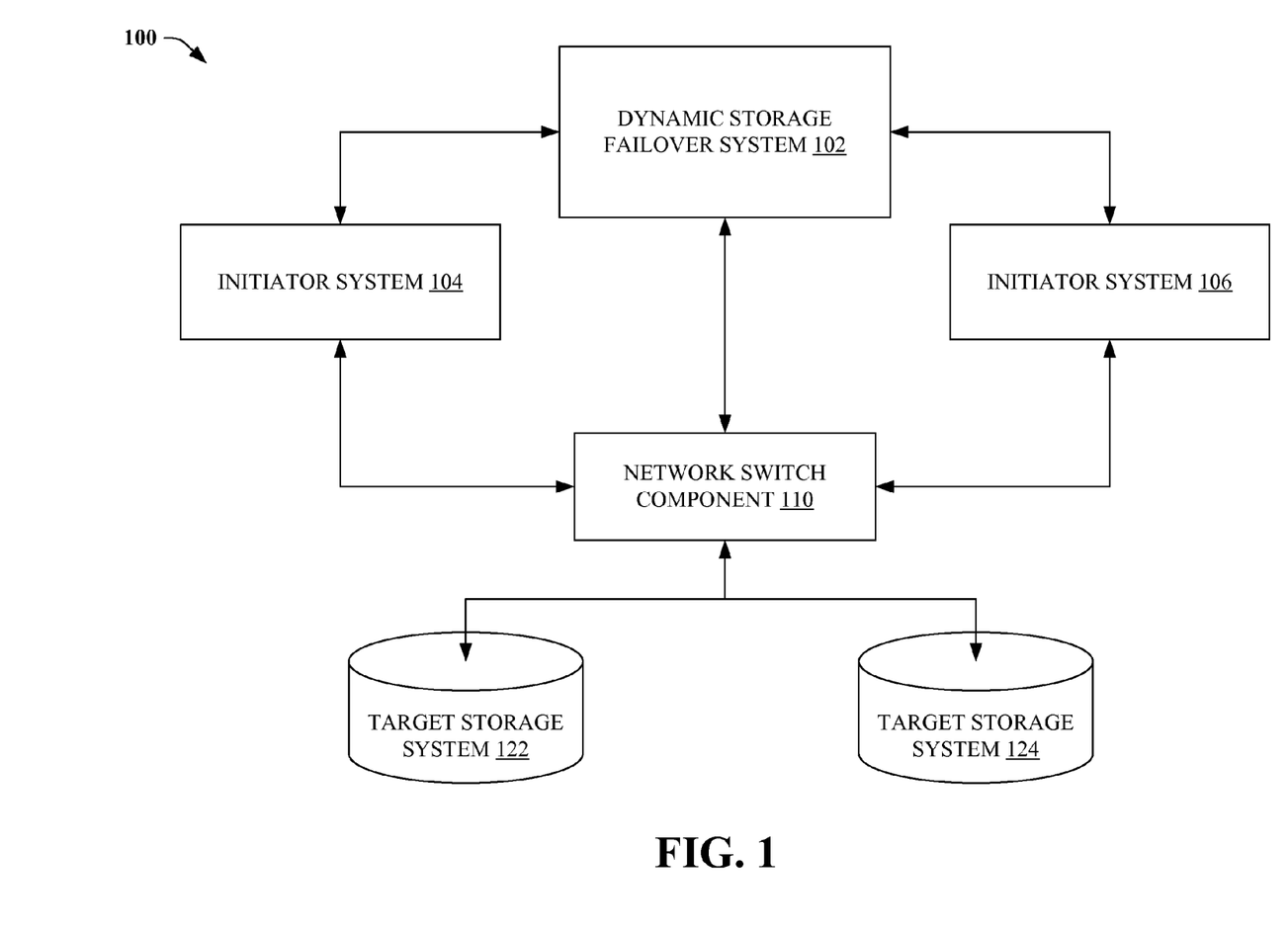
FIG. 1 illustrates a block diagram of a failover infrastructure, in accordance with various embodiments.

Referring now to FIG. 1, a block diagram of a failover infrastructure 100 is illustrated, in accordance with various embodiments. Aspects of failover infrastructure 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device (s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Failover infrastructure 100 includes dynamic storage failover system (DSFS) 102, which can perform "high availability" (HA) failover by dynamically reconfiguring switch zoning of a storage fabric in response to identification of a system failure. DSFS 102 can detect a failure of initiator system 104, 106, etc., for example, by determining initiator system 104, 106, etc. is "off-line", e.g., not communicatively coupled to target storage system 122, 124, etc., by determining initiator system 104, 160, etc. is unresponsive to a query, e.g., a communication, a network ping, etc. that is directed to initiator system 104, 106, etc. In other examples, the failure can be associated with a failure of a component, e.g., a processor, a computing device, a memory device, a host bus adapter (HBA), etc. of initiator system 104, 106, etc. In yet other examples, the failure can include a communication failure between initiator system 104, 106, etc. and target storage system 122, 124, etc., e.g., caused by a missing and/or damaged cable, communication link, etc. between initiator system 104, 106, etc. and one or more network switches of network switch component 110.

Initiator system 104, 106, etc. can include a computing resource, a server, a virtual machine, a virtual storage appliance, etc. that is assigned, or mapped, to a target storage system, e.g., 122, 124, etc. using a zone table, a zone data structure, etc. (not shown) that is associated with the one or more network switches of network switch component 110. As such, the one or more network switches can act as storage device de-multiplexors, e.g., linking storage devices of target storage system 122, 124, etc. to initiator system 104, 106, etc. using one or more zone tables. Further, network switch component 110 can utilize various communication protocols, e.g., SCSI, SATA, SCSI-over-Fiber Channel, SAS, iSCSI, ATA, AoE, SAN, etc. to perform input/output (I/O) fencing, or control, utilizing one or more zone tables that associate columns referencing initiator systems, e.g., 104, 106, etc. with columns referencing port identification (IDs) and block device IDs, e.g., logical unit numbers (LUNs), of various storage devices of target storage system 122, 124, etc. that are communicatively coupled, determined to be communicatively coupled, etc. between the one or more network switches of network switch component 110 and target storage system 122, 124, etc.

Target storage system 122, 124, etc. can include a block storage device, a "just a bunch of disks" (JBOD) storage device, a redundant array of inexpensive disks (RAID) "bunch of disks" (RBOD) storage device, a virtual storage appliance, etc. Further, the target storage device can include: Small Computer System Interface (SCSI) storage devices, which are based on a peripheral, peer-to-peer interface that can be used, e.g., in personal computer (PC) server systems; Serial Advanced Technology Attachment (SATA) storage devices; SCSI-over-Fiber Channel storage devices; SAS devices; Internet SCSI (iSCSI) devices, which are associated with an Internet Protocol (IP) based storage networking standard for linking data storage facilities and/or entities; Advanced Technology (AT) Attachment (ATA) storage devices; ATA over Ethernet (AoE) storage devices; other Storage Area Network (SAN) devices, etc.

In one or more embodiments, the zone table can include identification (ID) information representing initiator system 104, 106, etc. and target storage system 122, 124, etc., e.g., in response to DSFS 102 determining that initiator system 104, 106, etc. have been communicatively coupled to the one or more network switches of network switch component 110. Further, DSFS 102 can reassign, remap, etc. target storage system 122, 124, etc. from a first initiator system, e.g., 104, 106, etc. to a second initiator system, e.g., 106, 104, etc. using the zone table, e.g., by mapping a port ID associated with the second initiator system to a block device ID, e.g., or logical unit number (LUN), of target storage system 122, 124, etc. For example, DSFS 102 can replace a first port ID of the first initiator system in the zone table with a second port ID of the second initiator system.

In one or more other embodiments, DSFS 102 can initiate an access, by the second initiator system, of storage of target storage system 122, 124, etc. according to the zone table. For example, DSFS 102 can initiate the access by setting a bit value in the zone table corresponding to activation of a zone of the zone table—the zone referencing the second port ID of the second initiator system and the LUN associated with the storage. As such, by referencing the zone table, the second initiator system can confirm that is an "owner" of the storage cross-referenced to the second port ID according to the zone defined by the zone table.

Figure 2:
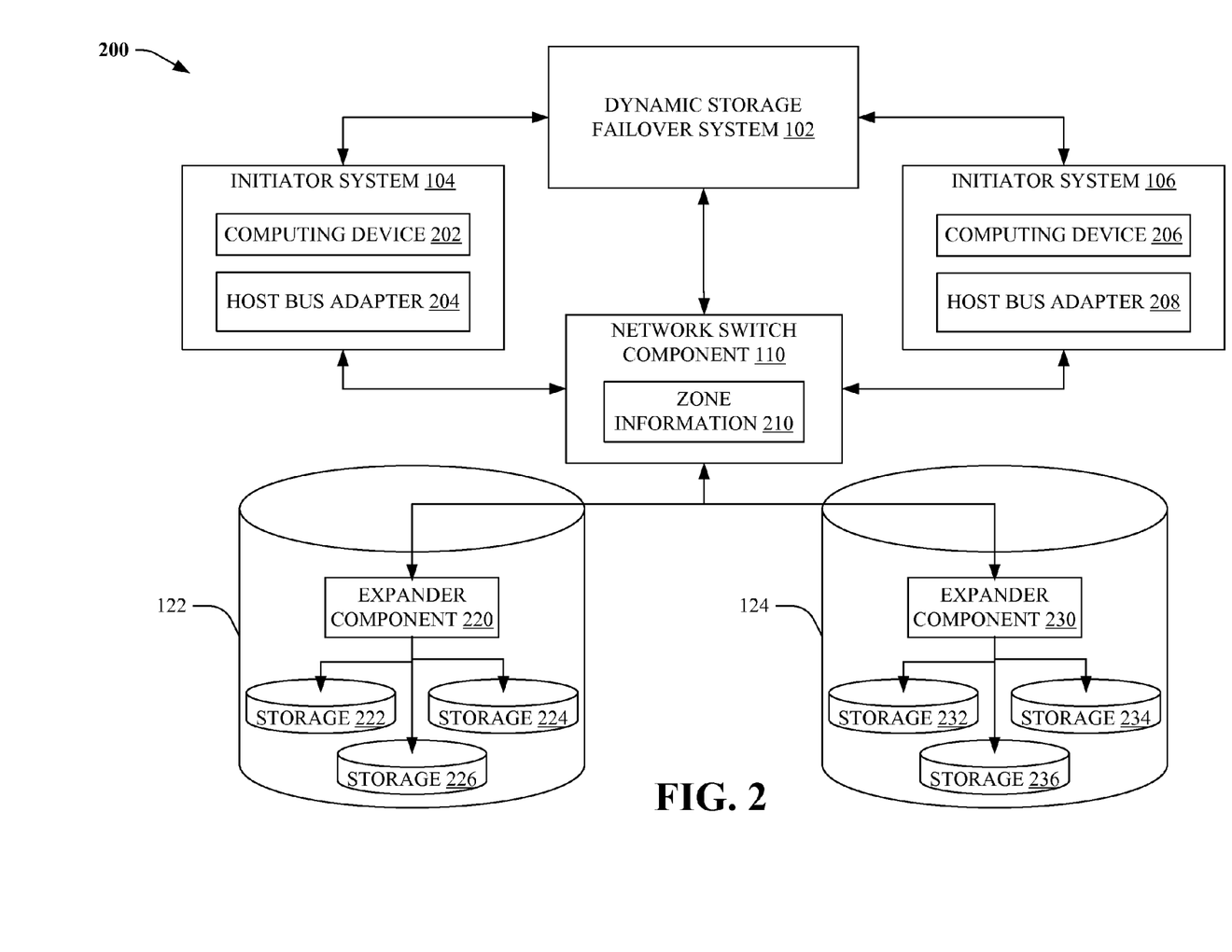
FIG. 2 illustrates a block diagram of another failover infrastructure, in accordance with various embodiments.

FIG. 2, illustrates a block diagram of another failover infrastructure (200), in accordance with various embodiments. Initiator system 104 can comprise a first server including a computing device 202 and host bus adapter (HBA) 204. Further, initiator system 106 can comprise a second server include computing device 206 and HBA 208. As such, the first server and the second server can be associated with distinct operating platforms, systems, virtual resources, e.g., virtual storage appliances allocated in hypervisor clusters, or virtual machine manager (VMM) clusters, as virtual machines, operating platforms, etc. Further, HBA 204, 208, etc. can include a virtual HBA that facilitates access between initiator system 104, 106, etc. and the one or more network switches of network switch component 110.

The one or more network switches are associated with zone information 210, which can include one or more zone tables (not shown) that can cross-reference initiator system 104, 106, etc. with target storage systems 122, 124, etc. The one or more zone tables can reference zone sets (not shown), wherein each zone set can associate an initiator system 104, 106, etc. with a group of different target storage systems 122, 124, etc. For example, a zone set can include, associate, etc. first storage of a first target storage system and second storage of a second storage system with an initiator system. In one or more embodiments, the first storage can be distinct in form, type, etc. from the second storage, and can be located in different locations, e.g., accessible via a network, e.g., the Internet. Further, DSFS 102 can initiate access of the first storage and the second storage by the initiator system by setting a bit value of a zone table corresponding to activation of a zone set of the zone table. As such, by referencing the zone table, the initiator system can confirm that is an "owner" of the storage cross-referenced to a port ID of the initiator system according to the zone set.

Further, in various embodiment(s), target storage systems 122, 124, etc. can include expander components, e.g., 220, 230, etc. that communicatively couple multiple storage devices, e.g., 222, 224, 226, 232, 234, 236, etc. to initiator system 104, 106, etc. via the one or more network switches of network switch component 110. The multiple storage devices can include SCSI storage devices, SATA storage devices; SCSI-over-Fiber Channel storage devices, SAS devices; iSCSI devices, ATA storage devices, AoE storage devices, other SAN devices, etc.

Figure 3:
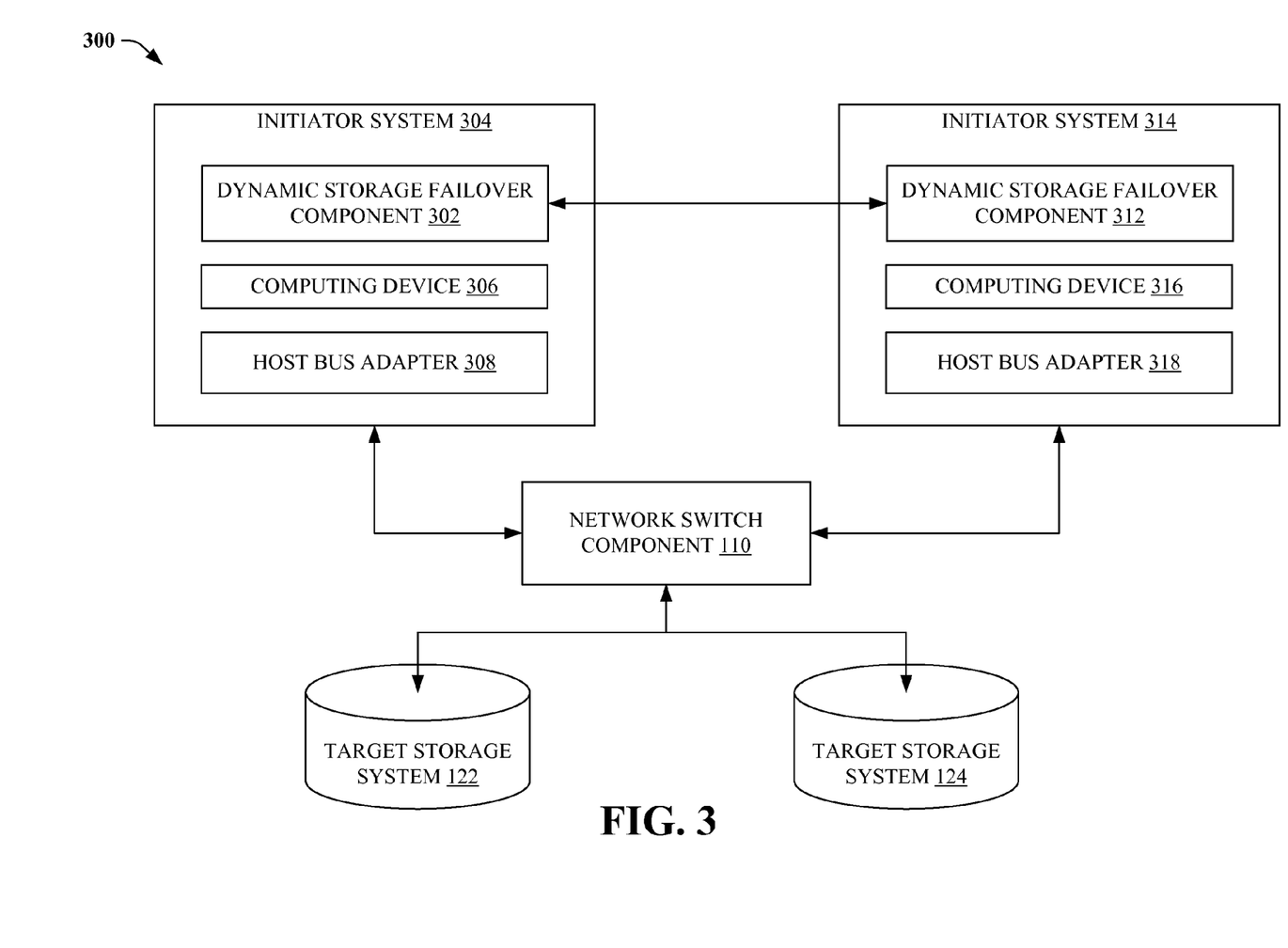
FIG. 3 illustrates a block diagram of yet another failover infrastructure, in accordance with various embodiments.

Referring now to FIG. 3, a block diagram of yet another failover infrastructure (300) is illustrated, in accordance with various embodiments. As illustrated by FIG. 3, one or more components, features, aspects, etc. of DSFS 102 can be included, reside, etc. within dynamic storage failover component (DSFC) 302, 312, etc. Further, DSFC 302, 312, etc. can be included in initiator system 304, 314, etc. As such, a first DSFC, e.g., 302, 312, etc. of a first initiator system, e.g., 304, can be communicatively coupled to a second initiator system, e.g., 314, and monitor whether the second initiator system is off-line, e.g., unresponsive to a query, a communication, etc. that directed to the second initiator systems, e.g., by the first DSFC.

Further, the first DSFC can reassign, remap, etc. a target storage system, e.g., 122, 124, etc. to the first initiator system using a zone table associated with storage switch component 110, e.g., by mapping a block device ID, e.g., or LUN, of the target storage system to a port ID of the first initiator system, e.g., by replacing a second port ID of the second initiator system in the zone table with a first port ID of the first initiator system. Furthermore, the first DSFC can initiate an access of the target storage system by the first initiator system by setting a bit value in the zone table corresponding to an activation of a zone of the zone table that references the first port ID of the first initiator system and the LUN of the target storage system.

Figure 4:
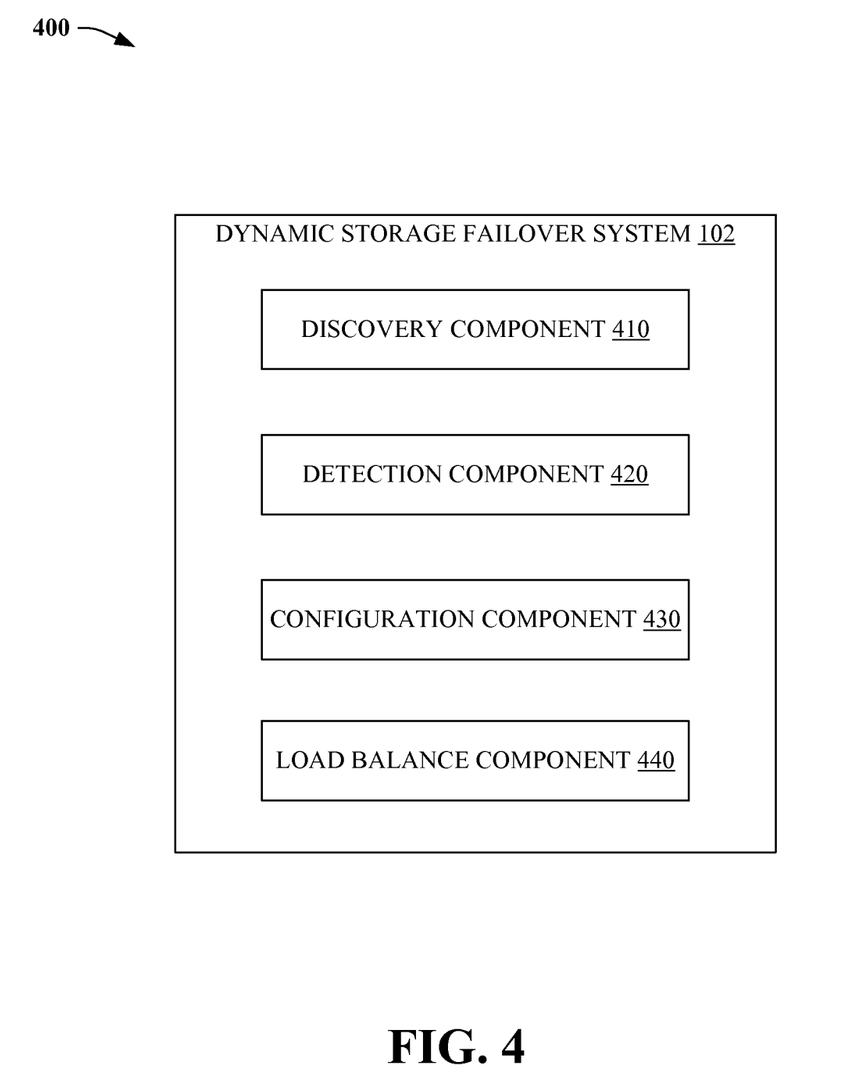
FIG. 4 illustrates a block diagram of a dynamic storage failover system, in accordance with various embodiments.

FIG. 4 illustrates a block diagram 400 of DSFS 102, in accordance with various embodiments. As illustrated by FIG. 4, DSFS 102 can include discovery component 410, detection component 420, configuration component 430, and load balance component 440. Discovery component 410 can discover ID information of storage fabric resources including, e.g., an initiator system (e.g., 104, 106, 304, 314, etc.), a host bus adapter (e.g., 204, 208, etc.) of the initiator system, a target storage system (e.g., 122,124, etc.), an expander component (e.g., 220, 230, etc.) of the target storage system, storage (e.g., 222, 224, 226, 232, 234, 236, etc.) of the target storage system, etc. In other embodiment(s), discovery component 410 can receive the ID information from another component (not shown) of the storage fabric resources. Further, discovery component 410 can discover the storage fabric resources, e.g., including network switches, storage systems, hosts, servers, etc. and determine which storage fabric resources can participate in a failover.

In other embodiment(s), detection component 420 can detect, e.g., utilizing the ID information discovered and/or received by discovery component 410, a failure of the initiator system, e.g., by determining whether the initiator system is off-line, unresponsive to a query directed to the initiator system by detection component 420, etc. Further, configuration component 430 can assign, map, etc. target storage system(s) to initiator system(s), e.g., by compiling, creating, deriving, modifying, etc. zone(s), zone aliases, zone table(s), zone set(s), zone group(s) etc. associated with the one or more network switches of network switch component 110, e.g., utilizing the ID information discovered and/or received by discover component 410.

In one or more embodiments, configuration component 430 can access the one or more network switches in response to authorization of login information, ID information, etc. Furthermore, configuration component 430 can discover a zone configuration utilizing a zone table, a zone set, etc. associated with the one or more network switches, and identify that the zone table maps, correlates, etc. the target storage system to the initiator system according to ID information representing the target storage system and the initiator system. Furthermore, configuration component 430 can verify that a table entry of the zone table indicates a zone state of the zone configuration is active, e.g., that storage associated with the target storage system can be accessed by the initiator system via the one or more network switches of network switch component 110.

In other embodiment(s), configuration component 430 can access the one or more network switches in response to an authorization of ID information associated with the one or more network switches. Further, configuration component 430 can discover, using the zone table, a zone configuration referencing the target storage system. Furthermore, configuration component 430 can assign, via the zone configuration, the target storage system to a designated failover system using ID information representing the target storage system and the designated failover system—the designated failover system determined, by DSFS 102, to be on-line, active, communicatively coupled to, etc. the one or more network switches.

Additionally, configuration component 430 can modify a table entry, or zone, of the zone table to indicate that a zone state for the zone is inactive. However, when a failover is initiated by DSFS 102, configuration component 430 can modify the zone of the zone table by setting a bit of the zone table to indicate that the zone state for the zone is active, e.g., so that storage associated with the target storage system can be access by the designated failover system via the one or more network switches of network switch component 110.

In one or more other embodiments, configuration component 430 can group target storage systems with a designated failover system to form a "failover group" object that can specify storage fabric resources to be associated with storage. For example, the failover group can specify virtual network interfaces, switches, media, disks, storage systems, zones, and/or other storage configuration information associated with storage that can be utilized by DSFS 102 during transferring of storage access from the initiator system to the designated failover system, e.g., in response to detection, by DSFS 102, of a failure associated with the initiator system.

In other embodiment(s), configuration component 430 can group target storage systems with more than one failover system, or servers, which can have concurrent access to the target storage systems, e.g., to ensure a minimum level of high availability, for example, to reduce latency of failover performed by DSFS 102.

In another embodiment, load balance component 440 can dynamically induce failover of storage resources from a first server, system, etc. to a second server, system, etc. in response to detection component 420 determining that use of a storage fabric can be optimized, e.g., in response to determining that processing performance, memory access performance, load balancing, etc. can be improved by inducing the failover.

In yet another embodiment, load balance component 440 can dynamically disable data access of the storage resources in response to detection component 420 determining a security breach, event, etc. associated with the storage resources has occurred.

FIGS. 5-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
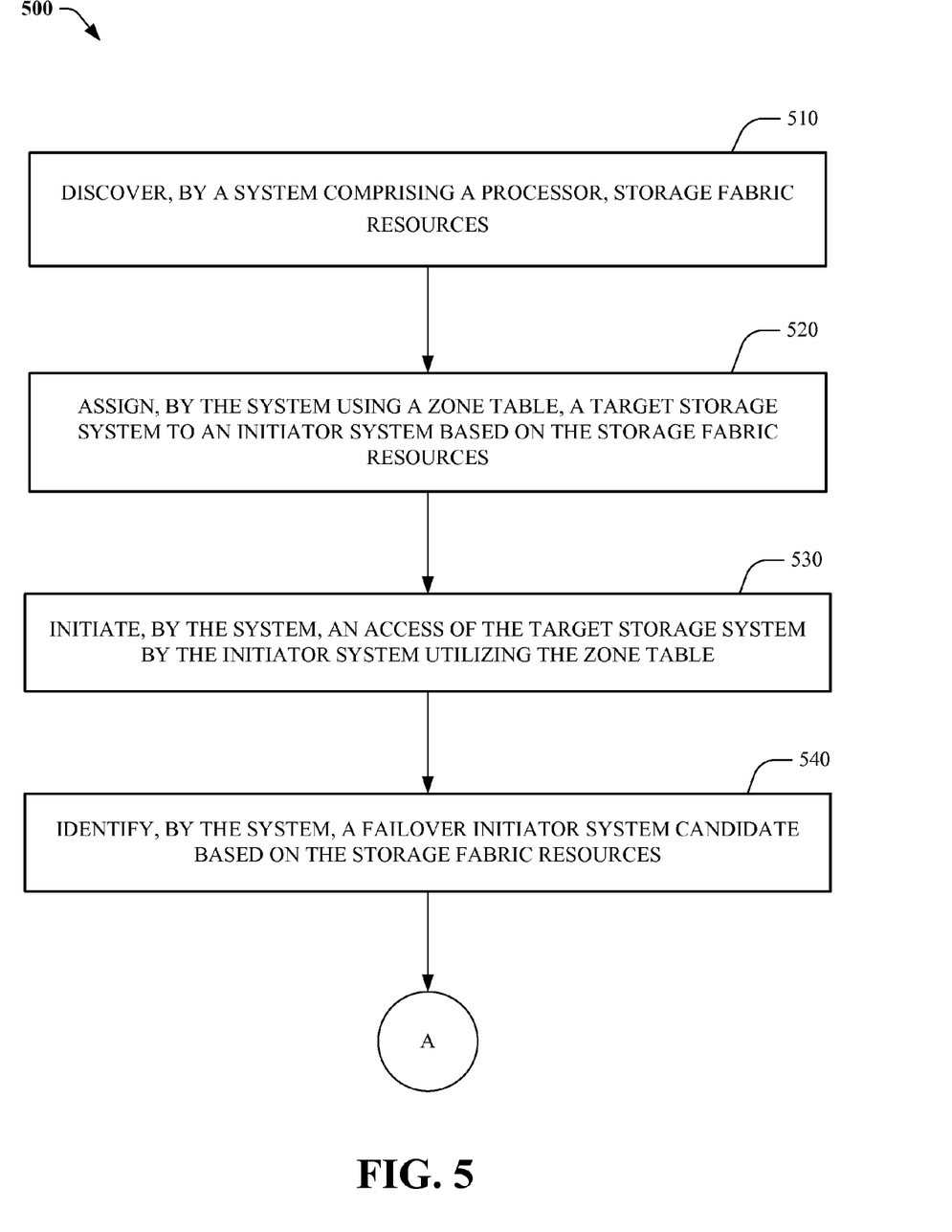
FIGS. 5-9 illustrate various processes associated with one or more dynamic storage failover infrastructures, in accordance with various embodiments.
Figure 6:
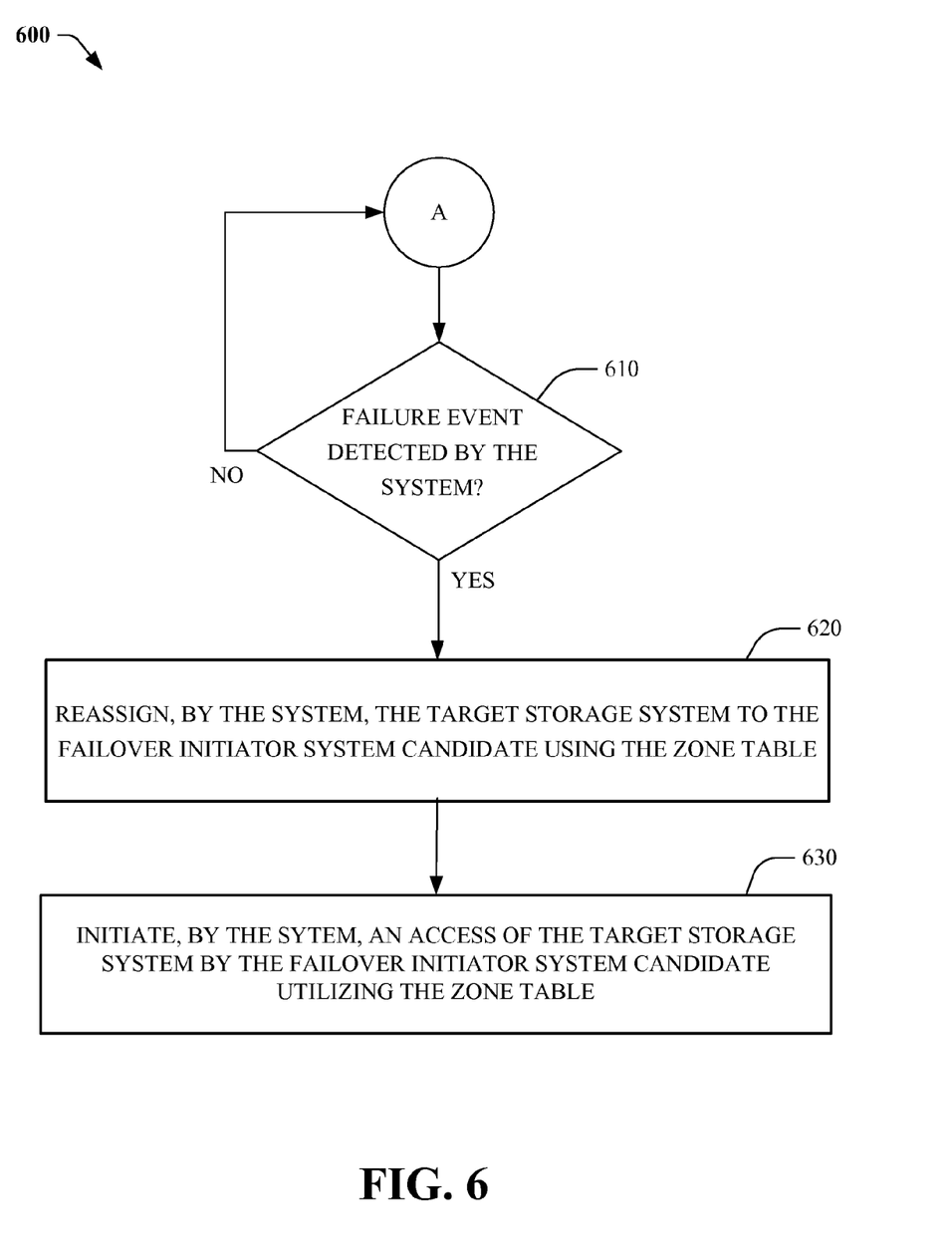

Referring now to FIGS. 5-6, processes 500 and 600 associated with a DSFS, e.g., 102, 304, 314, etc. are illustrated, in accordance with an embodiment. At 510, storage fabric resources can be discovered by the DSFS. At 520, a target storage system can be assigned, by the DSFS using a zone table, a zone data structure, etc. to an initiator system based on the storage fabric resources. At 530, an access of the target storage system by the initiator system can be initiated by the DSFS, e.g., by the DSFS setting a bit of the zone table. At 540, a failover initiator system candidate can be identified by the DSFS based on the storage fabric resources.

At 610, the DSFS can determine, detect, etc. whether a failure event occurred that is associated with the initiator system, e.g., whether the initiator system is off-in and/or unresponsive. In response to the failure event being detected, flow continues to 620, at which the DSFS can reassign the target storage system to the failover initiator system candidate using the zone table. At 630, the DSFS can initiate an access of the target storage system by the failover initiator system candidate utilizing the zone table, e.g., by setting a bit of the zone table associated with the target storage system and the failover initiator system.

Figure 7:
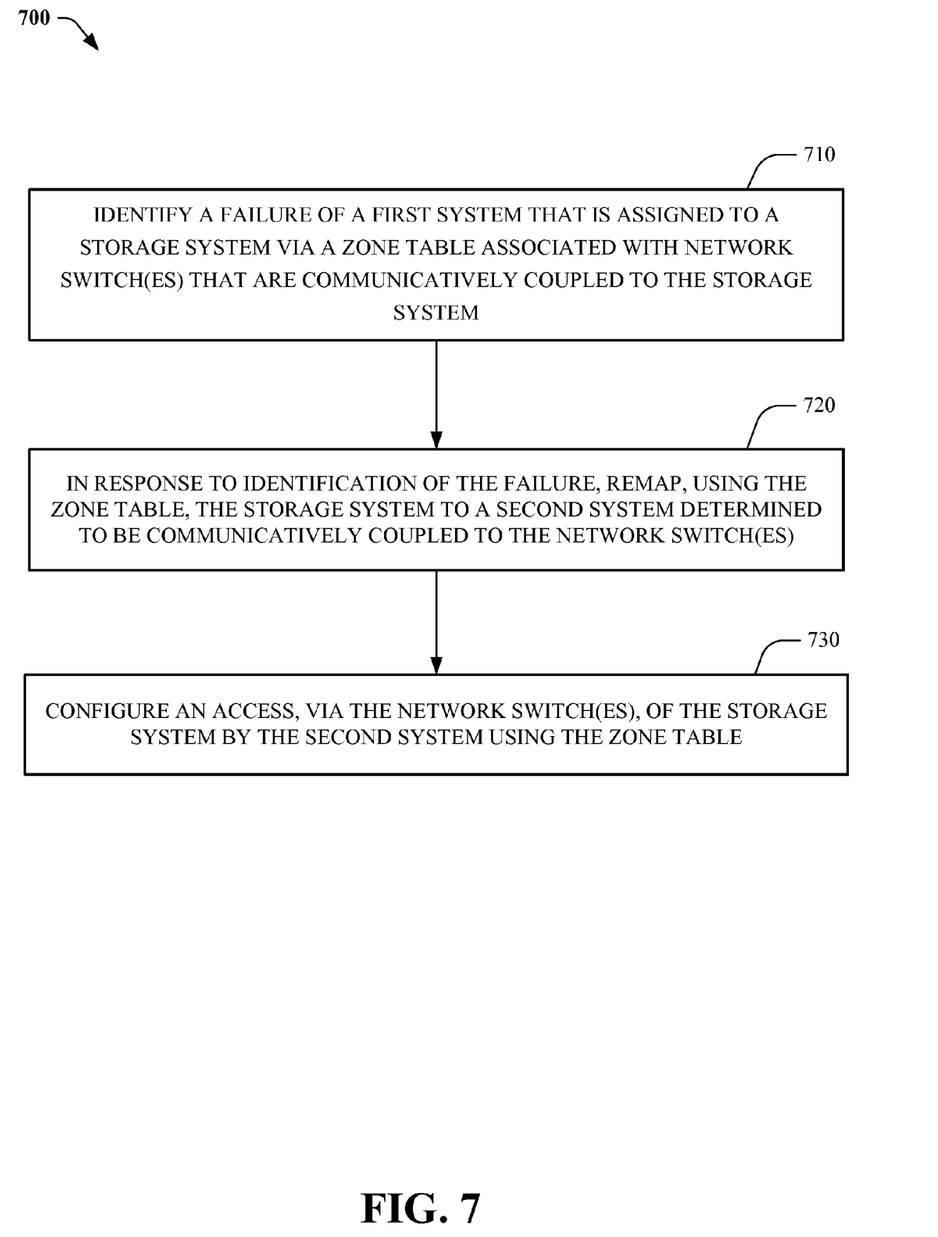
Figure 8:
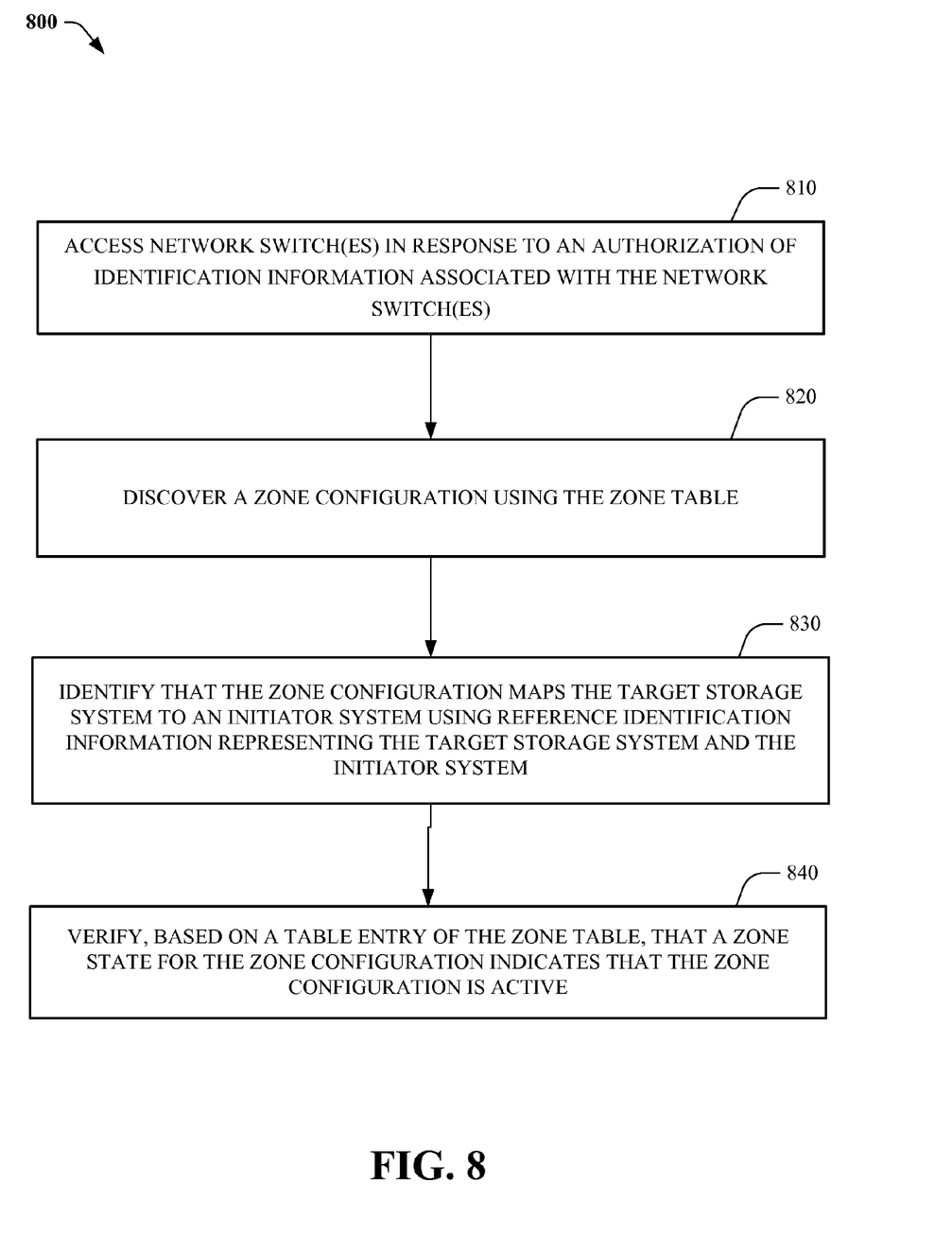
Figure 9:
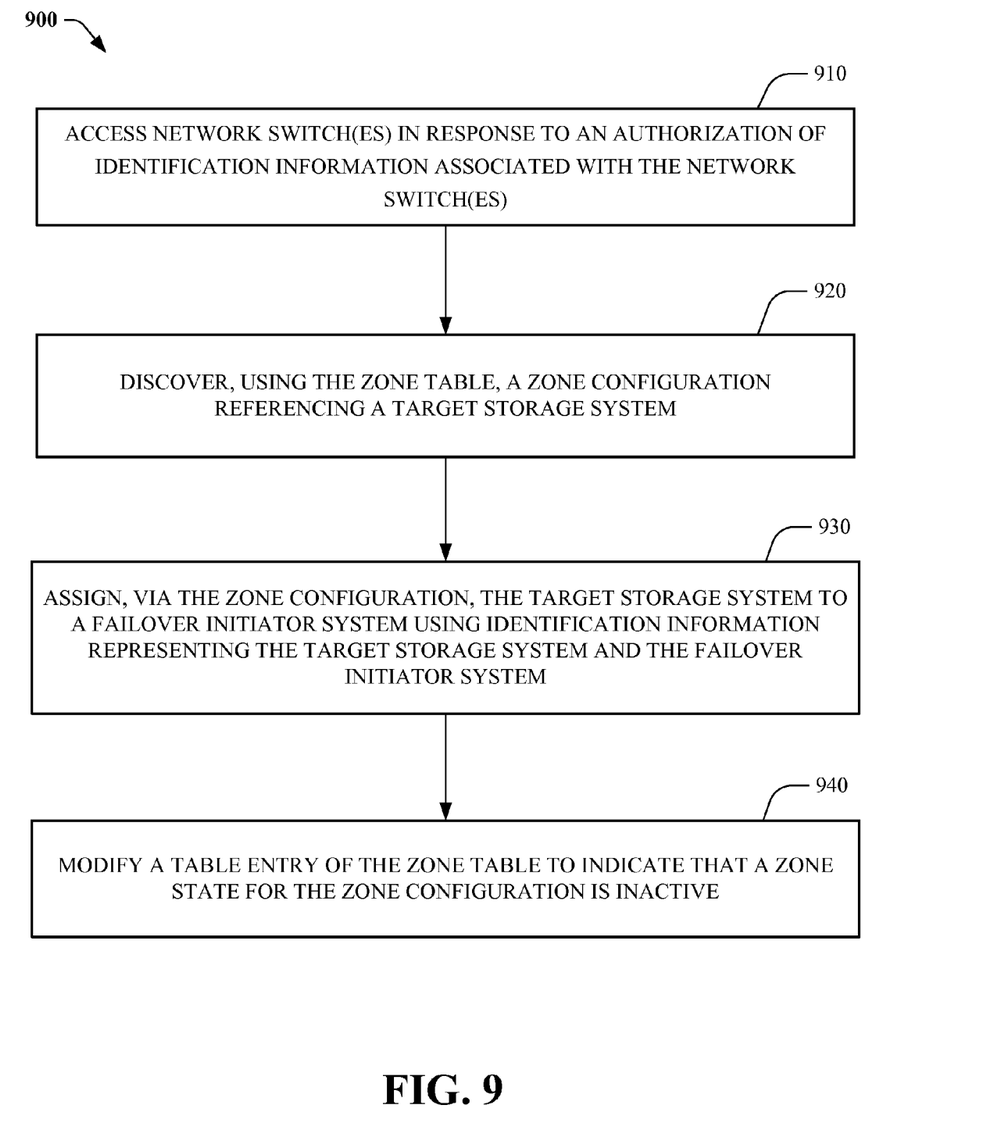

FIG. 7-9 illustrate other processes (700-900) associated with a DSFS, e.g., 102, 304, 314, etc., in accordance with an embodiment. At 710, a failure of a first system, which is assigned to a storage system via a zone table, zone data structure, etc. associated with one or more network switches that are communicatively coupled to the storage system, can be identified by the DSFS. At 720, the DSFS can remap, reassign, etc., using the zone table, the storage system to a second system determined to be on-line, or communicatively coupled to the one or more network switches, in response to identification of the failure. At 730, the DSFS, can configure an access, via the one or more network switches, of the storage system by the second system using the zone table, e.g., by setting a bit of the zone table associated with the storage system and the second system.

At 810, the DSFS can access one or more network switches in response to an authorization of identification information associated with such switches. At 820, the DSFS can discover a zone configuration using the zone table. At 830, the DSFS can identify that the zone configuration maps, associates, etc. the target storage system to a first initiator system using reference identification information representing the target storage system and the first initiator system. At 840, the DSFS can verify, based on a table entry of the zone, that a zone state for the zone configuration indicates that the zone configuration is active.

At 910, the DSFS can access the one or more network switches in response to the authorization described above. At

920, the DSFS can discover, using the zone table, the zone configuration referencing the target storage system. At 930, the DSFS can assign, via the zone configuration, the target storage system to a second initiator system, e.g., a failover initiator system, using identification information representing the target storage system and the failover initiator system. At 940, the DSFS can modify a table entry of the zone table to indicate that a zone state for the zone configuration is inactive. As such, the DSFS can remap, reassign, etc. the target storage system to the failover initiator system, which can be determined to be on-line or communicatively coupled to the one or more network switches, by modifying the table entry of the zone table to indicate that the zone state for the zone configuration is active in response to identification of a failure of the first initiator system.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
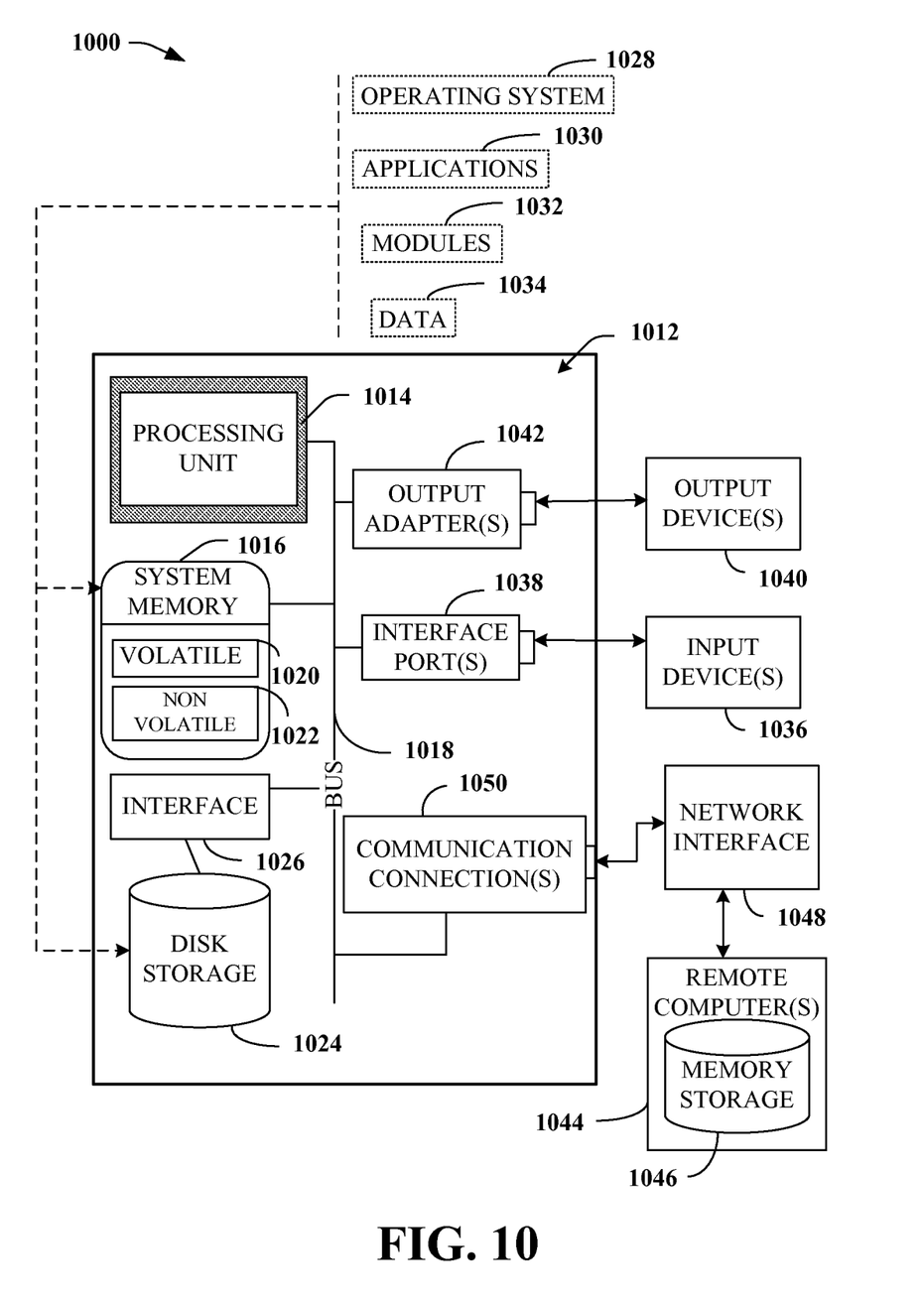
FIG. 10 illustrates a block diagram of a computing system operable to execute the disclosed systems and methods, in accordance with various embodiments.

In order to provide a context for the various aspects of the disclosed subject matter, FIG. 10, and the following discussion, are intended to provide a brief, general description of a suitable environment in which the various aspects of the disclosed subject matter can be implemented, e.g., various processes associated with FIGS. 1-9. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-110 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1014 through system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A failover system, comprising:
    at least one memory to store computer-executable instructions; and
    at least one processor, communicatively coupled to the at least one memory, that facilitates execution of the computer-executable instructions to at least:
        send a query directed to a first initiator system;
        detect a failure of the first initiator system with respect to a determination that the first initiator system is unresponsive to the query, wherein the first initiator system is assigned to a target storage system using a zone data structure associated with at least one network switch that is communicatively coupled to the target storage system;
        in response to the failure of the first initiator system being detected, reassign the target storage system to a second initiator system using first identification information of the zone data structure representing the target storage system and second identification information of the zone data structure representing the second initiator system, wherein the second initiator system is determined to be communicatively coupled to the at least one network switch; and
        initiate an access, via the at least one network switch using the first identification information and the second identification information, of the target storage system by the second initiator system.

2. A failover system of claim 1, wherein the failure is associated with another determination that the first initiator system is off-line.

3. A failover system of claim 1, wherein the failure comprises at least one of a component failure of a component of the first initiator system or a communication failure between the first initiator system and the storage system.

4. A failover system of claim 3, wherein the component comprises at least one of a computing device, a host bus adapter, or a memory device.

5. A failover system of claim 1, wherein the target storage system comprises at least one of a block storage device, a just a bunch of disks (JBOD) storage device, a redundant array of inexpensive disks (RAID) bunch of disks (RBOD) storage device, or a virtual storage appliance.

6. A failover system of claim 1, wherein the zone data structure is a zone table.

7. A failover system of claim 6, wherein the at least one processor further facilitates the execution of the computer-executable instructions to:
assign the first initiator system to the target storage system using system identification information.

8. A failover system of claim 1, wherein the at least one processor further facilitates the execution of the computer-executable instructions to:
discover storage identification information of storage fabric resources comprising a first host bus adapter of the first initiator system, a second host bus adapter of the second initiator system, the target storage system, and the at least one network switch; and
access the storage fabric resources using the storage identification information.

9. A failover system of claim 1, wherein the at least one processor further facilitates the execution of the computer-executable instructions to:
receive storage identification information of storage fabric resources comprising a first host bus adapter of the first initiator system, a second host bus adapter of the second initiator system, the target storage system, and the at least one network switch; and
access the storage fabric resources using the storage identification information.

10. A failover system of claim 1, wherein the at least one processor further facilitates the execution of the computer-executable instructions to:
reassign the target storage system to the second initiator system in response to another determination that the second initiator system is on-online and responsive to the query.

11. A failover system of claim 1, wherein the at least one processor further facilitates the execution of the computer-executable instructions to:
at least one of create or modify the zone data structure.

12. A failover system of claim 1, wherein the at least one processor further facilitates the execution of the computer-executable instructions to:
access the at least one network switch in response to an authorization of network identification information associated with the at least one network switch;
discover a zone configuration using the zone data structure;
identify that the zone configuration maps the target storage system to the first initiator system using reference identification information representing the target storage system and the first initiator system; and
verify, based on a table entry of the zone data structure, that a zone state for the zone configuration indicates that the zone configuration is active.

13. A failover system of claim 1, wherein the at least one processor further facilitates the execution of the computer-executable instructions to:
access the at least one network switch in response to an authorization of network identification information associated with the at least one network switch;
discover, using the zone data structure, a zone configuration referencing the target storage system;
assign, via the zone configuration, the target storage system to the second initiator system using the first identification information and the second identification information; and
modify a table entry of the zone data structure to indicate that a zone state for the zone configuration is inactive.

14. The failover system of claim 1, wherein the target storage system comprises a block storage device utilizing advanced technology (AT) attachment (ATA) based protocols comprising at least one of serial ATA (SATA) or ATA over ethernet (AoE).

15. The failover system of claim 1, wherein the target storage system comprises a block storage device utilizing small computer system interface (SCSI) based protocols comprising at least one of serial attached small computer system interface (SAS), fibre channel (FC) over ethernet (FCoE), or Internet SCSI (iSCSI).

16. A method, comprising: in response to determining, by a failover system comprising a processor, that a first initiator system is unresponsive to a query that has been directed to the first initiator system, identifying, by the failover system, a failure of the first initiator system, wherein the first initiator system is assigned to a storage system via a zone table associated with one or more network switches that are communicatively coupled to the storage system; in response to the identifying the failure, remapping, by the failover system using first information of the zone table representing the storage system and using second information of the zone table representing a second initiator system, the storage system to the second initiator system, wherein the second initiator system has been determined to be communicatively coupled to the one or more network switches; and configuring, by the failover system using the first information and the second information, an access, via the one or more network switches, of the storage system by the second initiator system.

17. The method of claim 16, wherein the identifying comprises: determining whether the first initiator system is off-line.

18. The method of claim 16, further comprising: assigning, by the failover system, the first initiator system to the storage system using system identification information of the zone table representing the first initiator system.

19. The method of claim 16, wherein the remapping comprises: assigning the second initiator system to the storage system using the second information.

20. A computer-readable storage medium comprising instructions that, in response to execution, cause a computing system comprising a processor to perform operations, comprising: determining, by a failover system, that a first initiator system is unresponsive to a query that has been directed to the first initiator system, wherein the first initiator system is assigned to a target storage system using a zone table associated with one or more network switches communicatively coupled to the target storage system, and wherein the zone table comprises first information representing the target storage system and second information representing a second initiator system that has been determined to be communicatively coupled to the one or more network switches; in response to the determining, reassigning, by the failover system using the first information and the second information, the target storage system to the second initiator system; and initiating, by the failover system via the one or more network switches using the first information and the second information, an access of storage of the target storage system by the second initiator system.

21. The computer-readable storage medium of claim 20, wherein the determining comprises:

determining whether the first initiator system is off-line.

22. The computer-readable storage medium of claim 20, wherein the reassigning comprises:

mapping the second initiator system to the storage of the target storage system using the second identification information.

\* \* \* \* \*